United States Patent
Xu et al.

(10) Patent No.: US 12,408,196 B2
(45) Date of Patent: Sep. 2, 2025

(54) CONTIGUOUS UPLINK TRANSMISSION IN CONTENTION-BASED ACCESS SYSTEMS

(71) Applicants: Changlong Xu, Beijing (CN); Xiaoxia Zhang, San Diego, CA (US); Jing Sun, San Diego, CA (US); QUALCOMM Incorporated, San Diego, CA (US)

(72) Inventors: Changlong Xu, Beijing (CN); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 309 days.

(21) Appl. No.: 17/759,475

(22) PCT Filed: Mar. 5, 2020

(86) PCT No.: PCT/CN2020/077880
§ 371 (c)(1),
(2) Date: Jul. 26, 2022

(87) PCT Pub. No.: WO2021/174472
PCT Pub. Date: Sep. 10, 2021

(65) Prior Publication Data
US 2023/0064684 A1 Mar. 2, 2023

(51) Int. Cl.
H04L 5/00 (2006.01)
H04L 1/08 (2006.01)
H04W 74/0808 (2024.01)

(52) U.S. Cl.
CPC ........... *H04W 74/0808* (2013.01); *H04L 1/08* (2013.01)

(58) Field of Classification Search
CPC .... H04W 74/0808; H04L 1/08; H04L 5/0087; H04L 5/001
See application file for complete search history.

(56) References Cited

U.S. PATENT DOCUMENTS

2016/0127098 A1* 5/2016 Ng ................. H04L 5/001 370/329
2016/0345206 A1* 11/2016 Yerramalli .......... H04W 74/006
(Continued)

FOREIGN PATENT DOCUMENTS

CN 103733550 A 4/2014
CN 109688626 A 4/2019
(Continued)

OTHER PUBLICATIONS

3GPP TSG-TSG RAN WG1 Meeting#96, R1-1903263 Title:Priority rules for SRS carrier switching (Year: 2019).*
(Continued)

*Primary Examiner* — Faruk Hamza
*Assistant Examiner* — Abusayeed M Haque
(74) *Attorney, Agent, or Firm* — Harrity & Harrity, LLP

(57) ABSTRACT

Various aspects of the present disclosure generally relate to wireless communication. In some aspects, a user equipment (UE) may attempt, for up to a threshold quantity of transmission opportunities of a plurality of transmission opportunities of a channel occupancy time in a transmission opportunity aggregation deployment, a listen-before-talk (LBT) procedure; and selectively transmit, based at least in part on the LBT procedure being successful within the threshold quantity of transmission opportunities, one or more repetitions of an uplink transmission in one or more remaining transmission opportunities of the plurality of transmission opportunities, or determine, based at least in part on the LBT procedure not being successful within the threshold quantity of transmission opportunities, that a failure of the uplink transmission has occurred. Numerous other aspects are provided.

24 Claims, 10 Drawing Sheets

(56) References Cited

U.S. PATENT DOCUMENTS

| | | | | |
|---|---|---|---|---|
| 2017/0353972 | A1* | 12/2017 | Babaei | H04W 76/20 |
| 2018/0042048 | A1 | 2/2018 | Hugl et al. | |
| 2018/0288805 | A1 | 10/2018 | Bhorkar et al. | |
| 2019/0075581 | A1* | 3/2019 | Salem | H04W 16/14 |
| 2019/0082462 | A1 | 3/2019 | Bergström et al. | |
| 2019/0254069 | A1* | 8/2019 | Ahn | H04L 27/0006 |
| 2019/0261382 | A1 | 8/2019 | Tian et al. | |
| 2019/0349998 | A1* | 11/2019 | Bhattad | H04L 1/0013 |
| 2020/0100093 | A1 | 3/2020 | Ren et al. | |
| 2020/0296635 | A1* | 9/2020 | Rastegardoost | H04W 36/0064 |
| 2020/0336973 | A1* | 10/2020 | Niu | H04W 72/23 |
| 2021/0235496 | A1* | 7/2021 | Park | H04B 1/715 |

FOREIGN PATENT DOCUMENTS

| | | | |
|---|---|---|---|
| CN | 109982432 | A | 7/2019 |
| CN | 110100400 | A | 8/2019 |
| WO | 2017180179 | A1 | 10/2017 |
| WO | 2019036622 | A1 | 2/2019 |

OTHER PUBLICATIONS

3GPP TSG-RAN WG2 Meeting#107, R2-1909175 Title:PLMN Selection for NR-U (Year: 2019).*

Fraunhofer Iis., et al., "UL Configured Grants for NR-U", 3GPP TSG RAN WG1 #97, R1-1907479, May 17, 2019 (May 17, 2019), 3 pages, the whole document.

Huawei., et al., "NR Frame Structure and Scheduling on Unlicensed Bands", 3GPP TSG RAN WG1 Meeting #92 bis, R1-1803678, Apr. 20, 2018 (Apr. 20, 2018), 8 pages, the whole document.

International Search Report and Written Opinion—PCT/CN2020/077880—ISA/EPO—Dec. 9, 2020.

VIVO: "Discussion on HARQ Operation for NR-U", 3GPP TSG RAN WG1#98bis, R1-1910206, Oct. 20, 2019 (Oct. 20, 2019), 10 pages, the whole document.

VIVO: "Discussion on the Enhancements to Configured Grants", 3GPP TSG RAN WG1 #98bis, R1-1910207, Oct. 4, 2019 (Oct. 4, 2019) sections 2-3, 9 pages.

Huawei, et al., "Remaining Issue on Handling UL LBT Failure", 3GPP TSG-RAN WG2 eMeeting 109, R2-2000957, 3rd Generation Partnership Project, Mobile Competence Centre, 650, Route Des Lucioles, F-06921 Sophia-Antipolis Cedex, France, vol. RAN WG2, No. eMeeting, Feb. 24, 2020-Mar. 6, 2020, Feb. 14, 2020, 3 Pages, XP052356123, p. 1.

Oppo: "HARQ Enhancements for NR-U", 3GPP TSG RAN WG1 #98, R1-1908419, 3rd Generation Partnership Project, Mobile Competence Centre, 650, Route Des Lucioles, F-06921 Sophia-Antipolis Cedex, France, vol. RAN WG1, No. Prague, Czech, Aug. 26, 2019-Aug. 30, 2019, Aug. 17, 2019, 6 Pages, XP051765028, Section 2.2, p. 4-5.

Supplementary European Search Report—EP20923582—Search Authority—The Hague—Oct. 23, 2023.

Oppo: "HARQ Enhancements for NR-U", 3GPP TSG RAN WG1 #98, R1-1908419, Prague, Czech, Aug 26, 2019-Aug. 30, 2019, 6 Pages, Aug. 17, 2019, Chapter 2.

Qualcomm Incorporated: "On UE Assumptions on UL LBT and start of UL Transmission", 3GPP TSG RAN WG1 #86bis, R1-1609954, Lisbon, Portugal, Oct. 10, 2016-Oct. 14, 2016, pp. 1-3, Oct. 1, 2016.

* cited by examiner

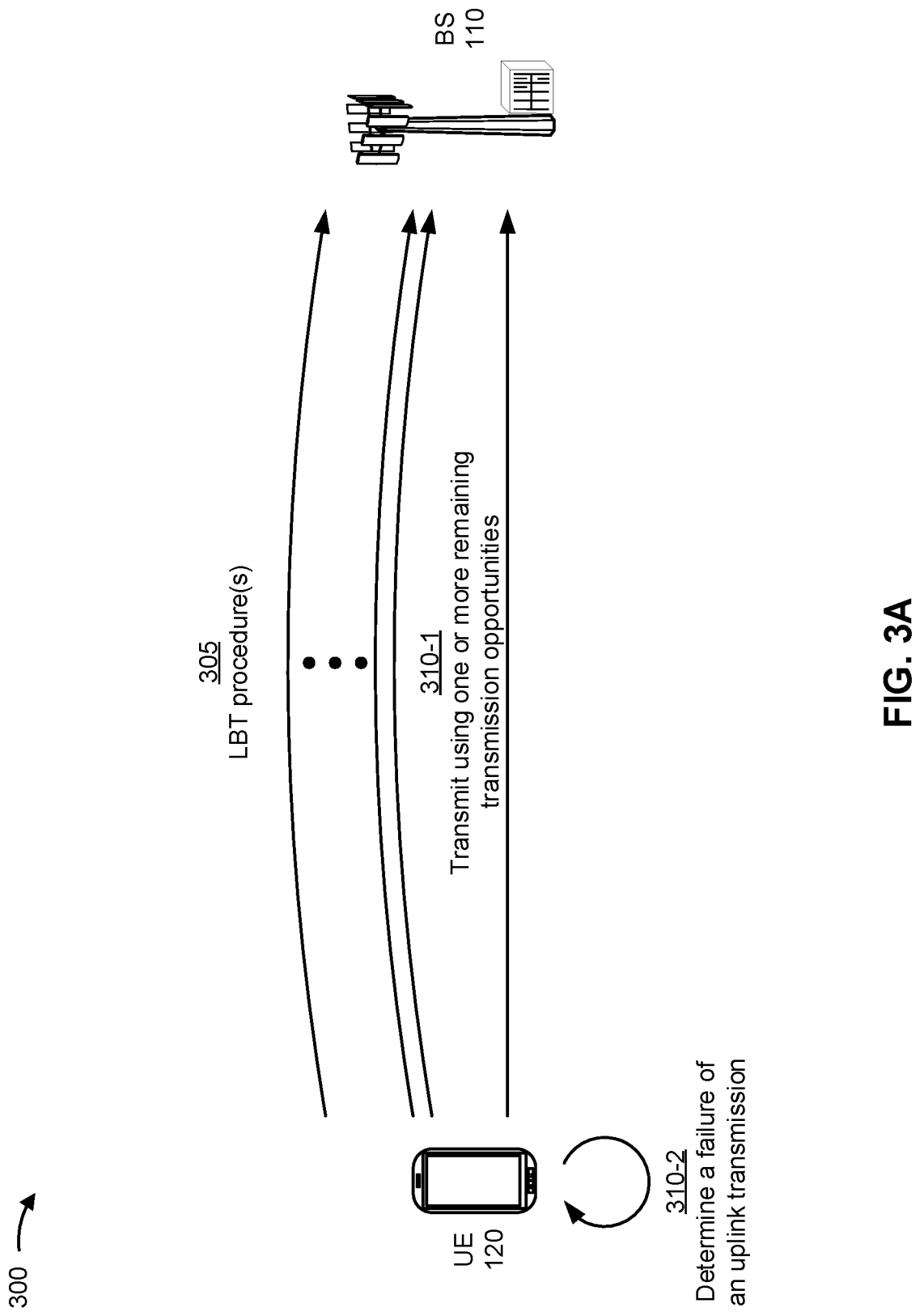

CONTIGUOUS UPLINK TRANSMISSION IN CONTENTION-BASED ACCESS SYSTEMS

CROSS-REFERENCE TO RELATED APPLICATION

This Patent Application is a 371 National Phase of Patent Cooperation Treaty (PCT) Patent Application No. PCT/CN2020/077880, filed on Mar. 5, 2020, entitled "CONTIGUOUS UPLINK TRANSMISSION IN CONTENTION-BASED ACCESS SYSTEMS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for contiguous uplink transmission in contention-based access systems.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include attempting, for up to a threshold quantity of transmission opportunities of a plurality of transmission opportunities of a channel occupancy time in a transmission opportunity aggregation deployment, a listen-before-talk (LBT) procedure; and selectively transmitting, based at least in part on the LBT procedure being successful within the threshold quantity of transmission opportunities, one or more repetitions of an uplink transmission in one or more remaining transmission opportunities of the plurality of transmission opportunities, or determining, based at least in part on the LBT procedure not being successful within the threshold quantity of transmission opportunities, that a failure of the uplink transmission has occurred.

In some aspects, a UE for wireless communication may include a memory and one or more processors operatively coupled to the memory. The memory and the one or more processors may be configured to attempt, for up to a threshold quantity of transmission opportunities of a plurality of transmission opportunities of a channel occupancy time in a transmission opportunity aggregation deployment, an LBT procedure; and selectively transmit, based at least in part on the LBT procedure being successful within the threshold quantity of transmission opportunities, one or more repetitions of an uplink transmission in one or more remaining transmission opportunities of the plurality of transmission opportunities, or determine, based at least in part on the LBT procedure not being successful within the threshold quantity of transmission opportunities, that a failure of the uplink transmission has occurred.

In some aspects, a non-transitory computer-readable medium may store one or more instructions for wireless communication. The one or more instructions, when executed by one or more processors of a UE, may cause the one or more processors to attempt, for up to a threshold quantity of transmission opportunities of a plurality of transmission opportunities of a channel occupancy time in a transmission opportunity aggregation deployment, an LBT procedure; and selectively transmit, based at least in part on the LBT procedure being successful within the threshold quantity of transmission opportunities, one or more repetitions of an uplink transmission in one or more remaining transmission opportunities of the plurality of transmission opportunities, or determine, based at least in part on the LBT procedure not being successful within the threshold quantity of transmission opportunities, that a failure of the uplink transmission has occurred.

In some aspects, an apparatus for wireless communication may include means for attempting, for up to a threshold quantity of transmission opportunities of a plurality of transmission opportunities of a channel occupancy time in a transmission opportunity aggregation deployment, an LBT procedure; and means for selectively transmitting, based at least in part on the LBT procedure being successful within the threshold quantity of transmission opportunities, one or more repetitions of an uplink transmission in one or more remaining transmission opportunities of the plurality of transmission opportunities, or means for determining, based at least in part on the LBT procedure not being successful within the threshold quantity of transmission opportunities, that a failure of the uplink transmission has occurred.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A-3G are diagrams illustrating examples of contiguous uplink transmission in contention-based access systems, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
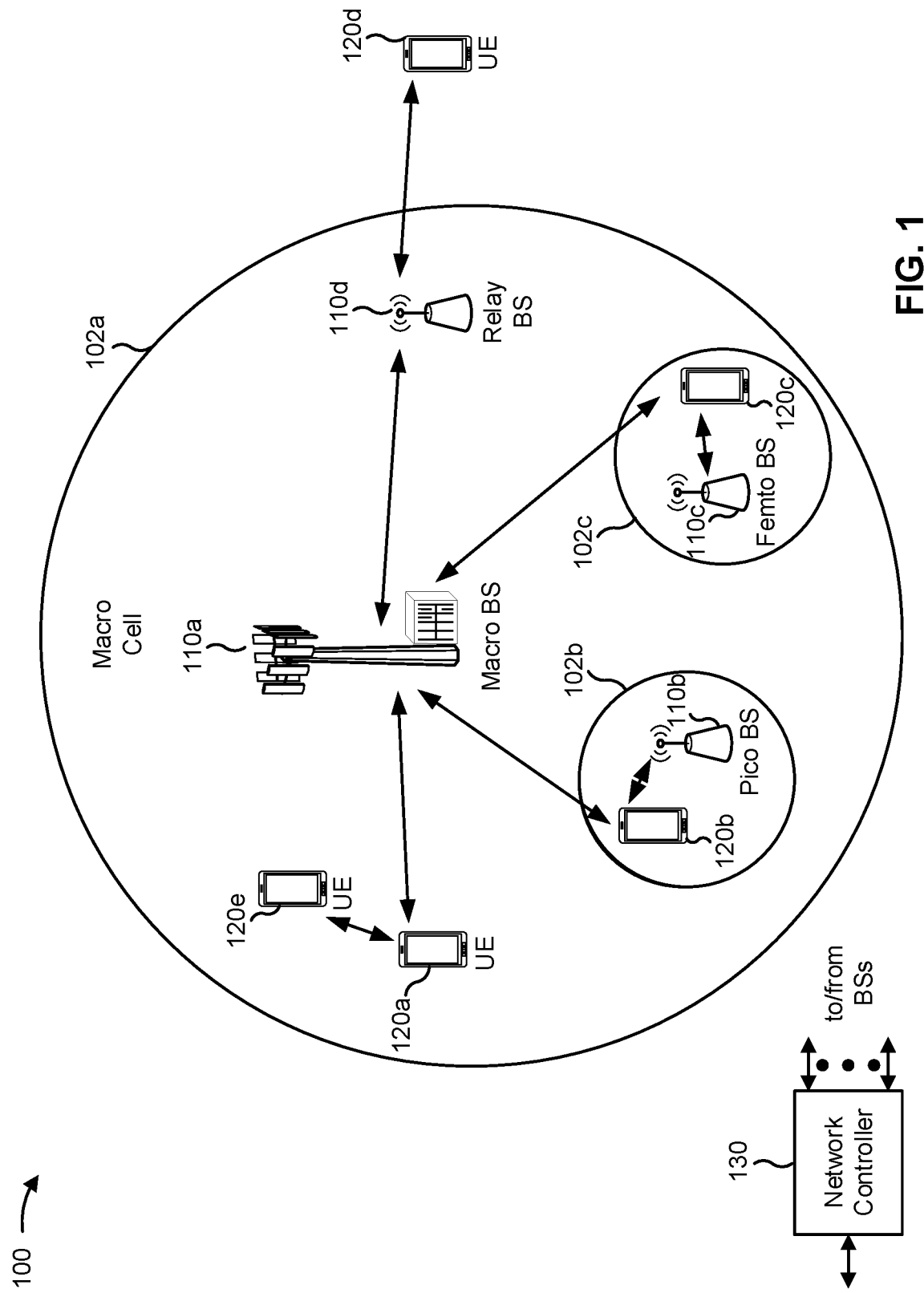
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. ABS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
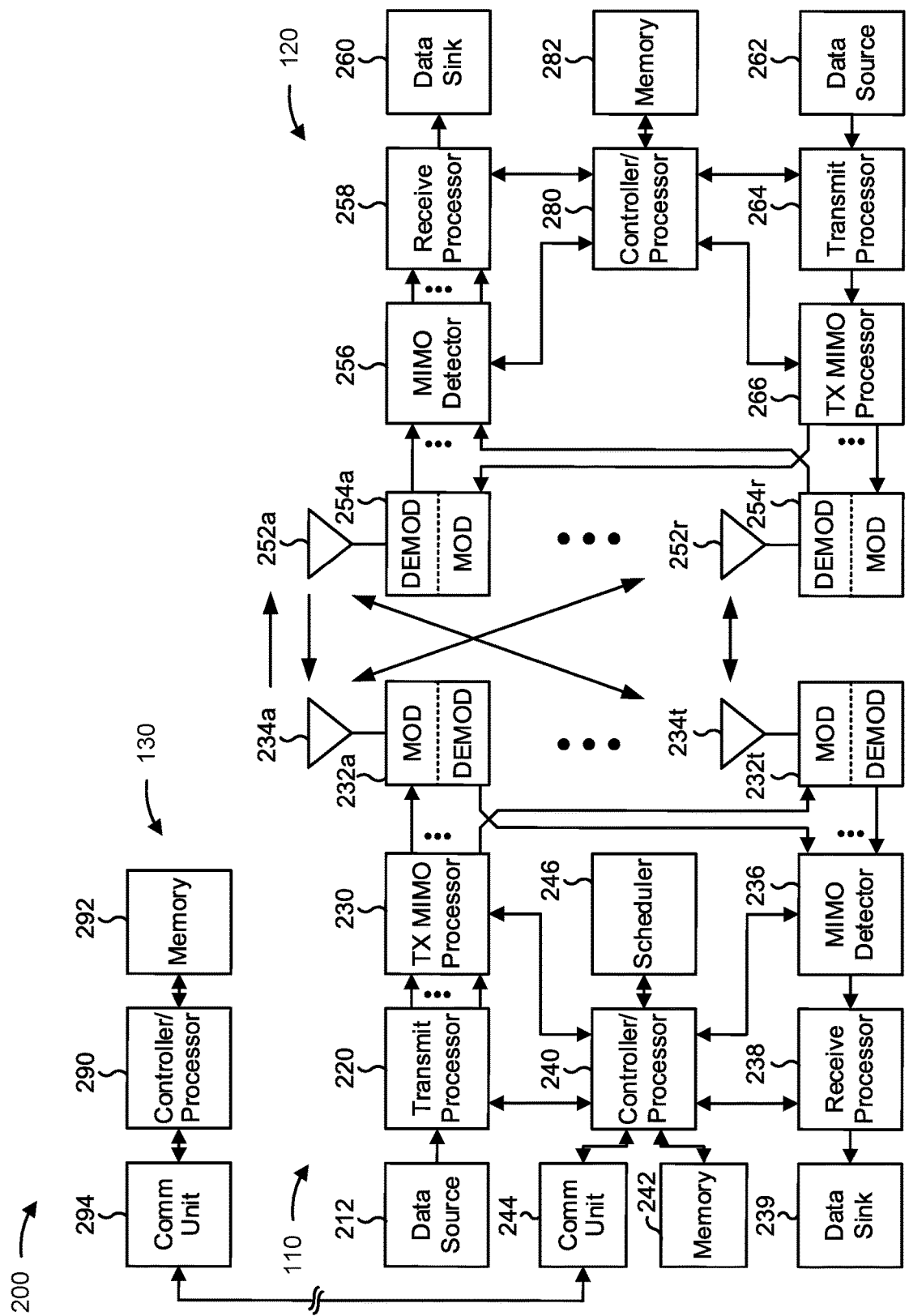
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with contiguous uplink transmission in contention-based access systems, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 400 of FIG. 4 and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for attempting, for up to a threshold quantity of transmission opportunities of a plurality of transmission opportunities of a channel occupancy time in a transmission opportunity aggregation deployment, a listen-before-talk (LBT) procedure, means for selectively transmitting, based at least in part on the LBT procedure being successful within the threshold quantity of transmission opportunities, one or more repetitions of an uplink transmission in one or more remaining transmission opportunities of the plurality of transmission opportunities, means for determining, based at least in part on the LBT procedure not being successful within the threshold quantity of transmission opportunities, that a failure of the uplink transmission has occurred, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

In contention-based access systems, a first UE may transmit one or more signals to indicate a reservation of resources for a subsequent transmission. When the first UE does not detect one or more signals from any other UEs, the first UE may determine that resources are available for use and the other UEs, based at least in part on detecting the one or more signals from the first UE, may determine that the resources are not available for use. In contrast, when the first UE detects one or more signals from a second UE, the first UE may determine that the second UE has reserved the resources and may forgo use of the resources. In this way, UEs may used unscheduled resources for communication without causing interference with other UEs.

Uplink communications, for which a UE may reserve resources, may include physical uplink shared channel (PUSCH) communications, physical uplink control channel (PUCCH) communications, sounding reference signal (SRS) communications, positioning reference signal (PRS) communications, and/or the like. The UE may use slot aggregation to transmit a plurality of repetitions of, for example, a PUSCH communication or a PUCCH communication, to improve coverage relative to a single transmission. With regard to PUCCH communications, the UE may transmit a short format PUCCH (e.g., PUCCH format 0 or PUCCH format 2) that includes 1 to 2 orthogonal frequency division multiplexing (OFDM) symbols in a slot or a long format PUCCH (e.g., PUCCH format 1, PUCCH format 3, or PUCCH format 4) that includes 4 to 14 OFDM symbols in a slot.

When transmitting a plurality of repetitions of a long format PUCCH (e.g., in slot aggregation), the UE may transmit uplink control information (UCI) of the PUCCH in a plurality of slots. In some cases, the UE may repeat the UCI in a plurality of consecutive slots and may use the same pattern of symbols in each slot in which the long format PUCCH is transmitted. When a repetition of the PUCCH (e.g., from a second transmission of the PUCCH, which may be termed a second repetition, onward) overlaps with a PUSCH communication, the UE may drop the PUSCH and may continue transmitting the repetition of the PUCCH. In some cases, the UE may require an allocation of 14 OFDM symbols to enable contiguous transmission of the PUCCH.

When transmitting an SRS communication, the UE may transmit one or more repetitions of the SRS communication to enable uplink channel state information (CSI) measurements to enable a BS to perform scheduling, link adaptation, beam management, and/or the like. Configuration of an SRS communication may be UE-specific and may be a periodic, aperiodic, or semi-persistent configuration for a plurality of resource sets. Each SRS resource, of a resource set, may include a particular quantity of antenna ports (e.g., 1, 2, or 4 antenna ports) that map to a particular quantity of adjacent OFDM symbols (e.g., 1, 2, or 4 OFDM symbols). A UE may receive, from the BS, information configuring one or more SRS resources within a time domain mapping determined based at least in part on an indicated start position, number of symbols, or repetition factor for SRS communication. In some cases, SRS resources may be in OFDM symbols locations other than a last 6 symbols of a slot and may enable time division multiplexing of a PUSCH and an SRS. In some cases, a BS may use radio resource control (RRC) signaling to configure an SRS resource to start in a specified OFDM symbol within a slot. When transmitting a PRS communication, the UE may receive configuration information, from the BS, configuring the PRS communication to occur in any OFDM symbol of a slot. The UE may transmit the PRS communication using a single-port configuration and without frequency hopping.

A PUSCH communication may be scheduled for transmission in a contiguous set of slots using contention-based access procedures. However, some techniques do not provide configurations for PUCCH communication with slot aggregation, SRS communication or PRS communication across a plurality of OFDM symbols, and/or the like, thereby limiting coverage enhancements to PUSCH communication. Some aspects described herein enable improved coverage for uplink communication. For example, a UE may perform a contiguous transmission of a PUCCH with slot aggregation using listen-before-talk (LBT) procedures to reserve resources for the PUCCH in a contention-based access system. Similarly, the UE may perform a transmission of an SRS communication or a PRS communication across a plurality of OFDM symbols using LBT procedures to reserve resources in a contention-based access system. In this way, the UE enables improved coverage for uplink communication.

Figure 3B:
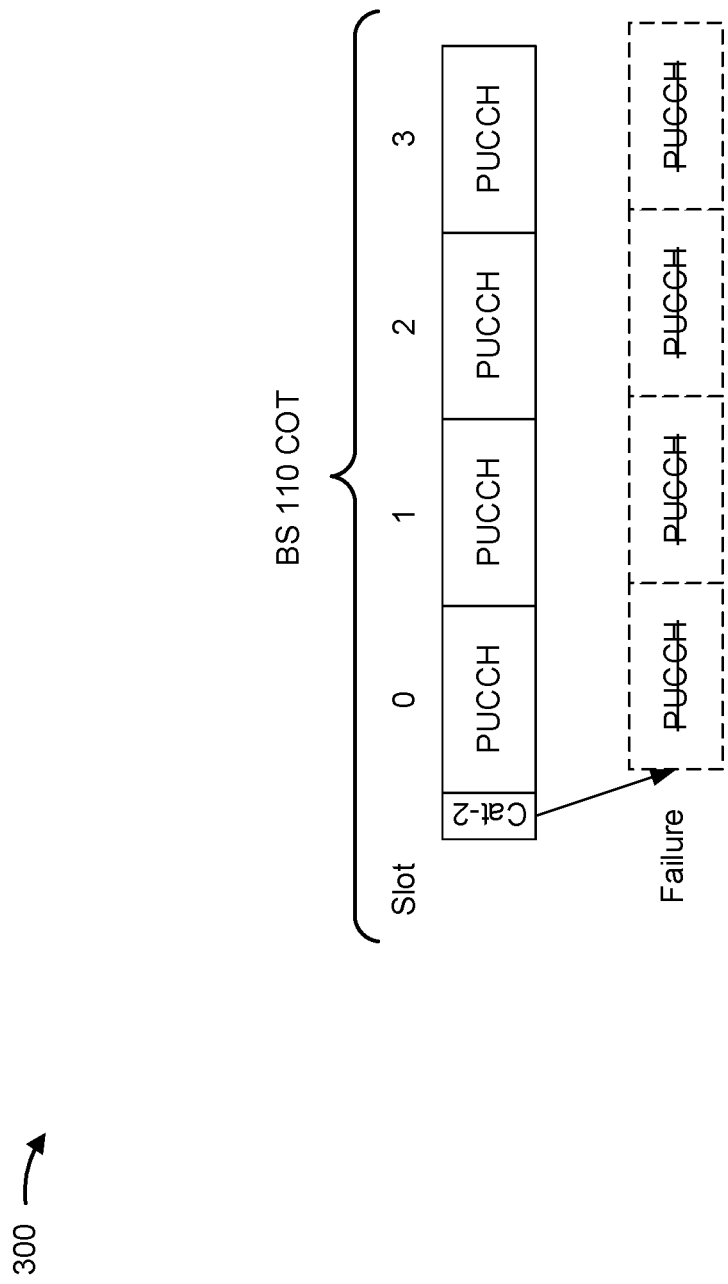

FIGS. 3A-3G are diagrams illustrating an example 300 of contiguous uplink transmission in contention-based access systems, in accordance with various aspects of the present disclosure. As shown in FIG. 3A, example 300 includes a BS 110 and a UE 120.

As further shown in FIG. 3A, and by reference number 305, UE 120 may perform one or more LBT procedures. For example, UE 120 may transmit one or more LBT transmissions to attempt to access a channel for transmission of a repetition of a PUCCH communication, an SRS communication, a PRS communication, and/or the like. In some aspects, UE 120 may transmit a category-2 LBT transmission. For example, when a PUCCH duration is within a channel occupancy time (COT) of BS 110, UE 120 may perform a category-2 LBT procedure that includes transmitting a category-2 LBT transmission to attempt to reserve a resource. Alternatively, UE 120 may perform a category-4 LBT procedure (e.g., when a PUCCH duration is not within a COT of BS 110).

As further shown in FIG. 3A, and by reference numbers 310-1 and 310-2, based at least in part on a result of performing one or more LBT procedures, UE 120 may perform a response action, such as transmitting one or more repetitions of an uplink communication, determining a failure of transmission of the uplink communication, and/or the like. For example, when UE 120 is not successful in performing an LBT procedure prior to a threshold transmission opportunity, UE 120 may determine a failure of transmission of the uplink communication. Alternatively, when UE 120 is successful in performing the LBT procedure prior to the threshold transmission opportunity, UE 120 may use one or more remaining transmission opportunities to transmit an uplink communication. For example, when UE 120 perform one or more LBT procedures to access a channel up to a particular slot (or up to a successful LBT procedure). If UE 120 cannot access a channel for transmission prior to a particular slot of a set of aggregated slots, UE 120 may determine a failure. Alternatively, if UE 120 does access the channel using a successful LBT procedure, UE 120 may transmit a set of repetitions of an uplink communication.

As an example, and as shown in FIG. 3B, UE 120 may transmit a category-2 LBT transmission before a zeroth slot to attempt to reserve resources for transmission of a plurality of repetitions of a PUCCH communication. In this case, as shown, the LBT transmission may fail (e.g., another UE may reserve a resource in slot 0 that UE 120 attempted to reserve for transmission of a PUCCH communication repetition). Based at least in part on a threshold transmission opportunity being the first slot, UE 120 may determine a failure and may forgo transmitting the PUCCH communication, as shown.

Figure 3C:
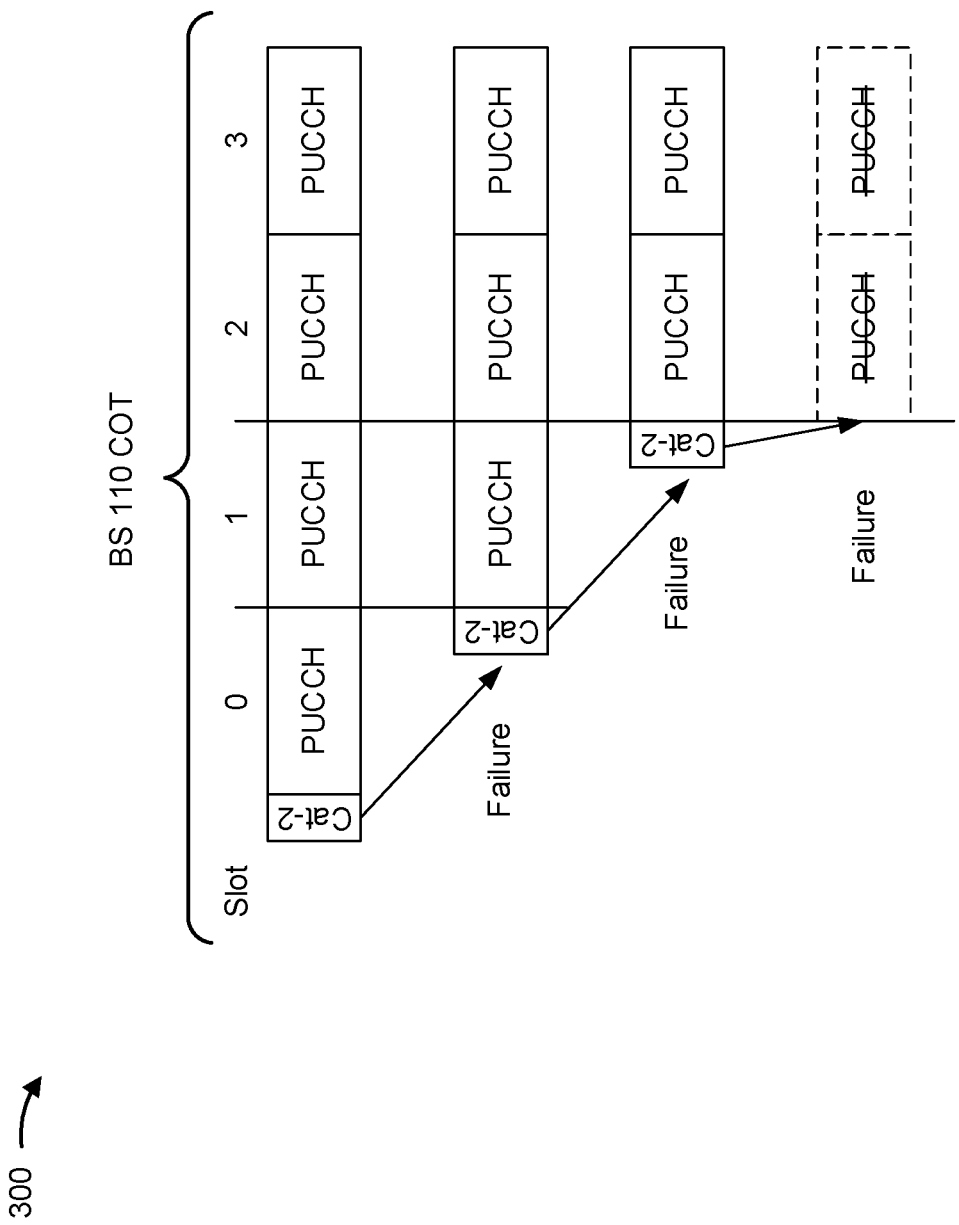

Similarly, as shown in FIG. 3C, UE 120 may transmit a first category-2 LBT transmission before the zeroth slot to attempt to reserve resources. In this case, the threshold transmission opportunity is half an aggregation level (e.g., the threshold transmission opportunity is slot 2 based at least in part on an aggregation level of 4 slots). As a result, UE 120 attempts another category-2 LBT procedure before a slot 1 and again fails to access a channel to reserve resources. Similarly, based at least in part on the failure for slot 1, UE 120 attempts another category-2 LBT procedure before a slot 2. In this case, based at least in part on the threshold transmission opportunity being slot 2 and a failure of the category-2 LBT procedure for slot 2, UE 120 may determine a failure and may forgo transmitting the PUCCH communication.

Figure 3D:
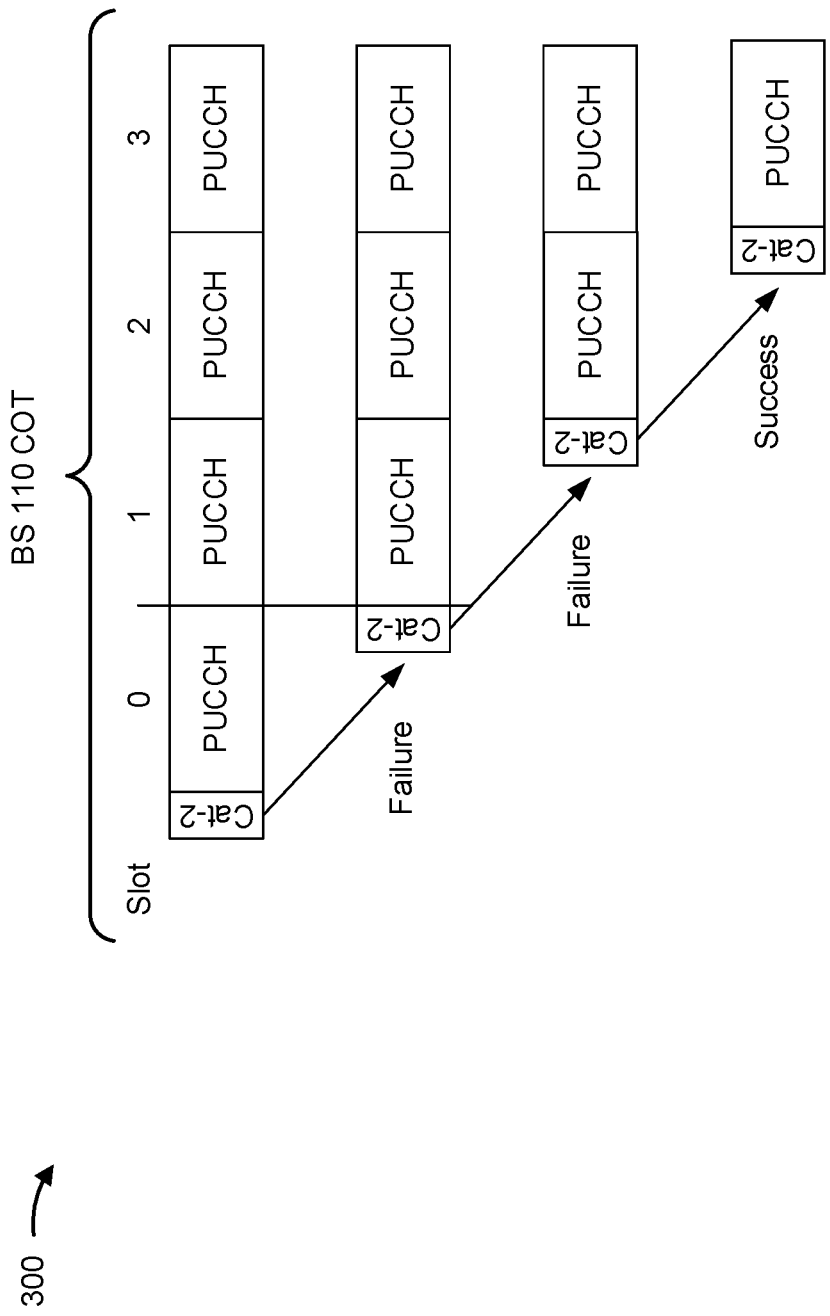
Figure 3E:
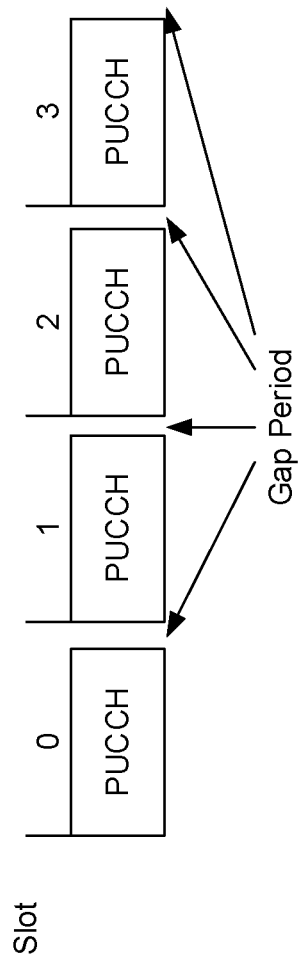

In contrast, as shown in FIG. 3D, when the threshold transmission opportunity is a last slot of a set of slots (e.g., slot 3 of a group of 4 aggregated slots), UE 120 may attempt category-2 LBT procedures until slot 3 before determining a failure. In this case, in a category-2 LBT procedure for slot 3, UE 120 is successful in accessing a channel and transmits a single transmission (which may be termed a single repetition) of the PUCCH communication. As another example, when UE 120 is successful in a category-2 LBT procedure for slot 1 (rather than a failure, as shown), UE 120 may transmit a set of repetitions of the PUCCH communication is slots 1 to 3. In some aspects, as shown in FIG. 3E, each slot in which UE 120 transmits a repetition of the PUCCH communication (e.g., slots 0, 1, 2, 3, and/or the like) may include a gap period to enable contiguous transmission of the PUCCH communication with slot aggregation. In this case, the gap period may be a threshold period of time (e.g., 16 microseconds (μs)) to enable LBT procedures prior to each slot while still enabling the repetitions of the PUCCH communication to be contiguous.

Figure 3F:
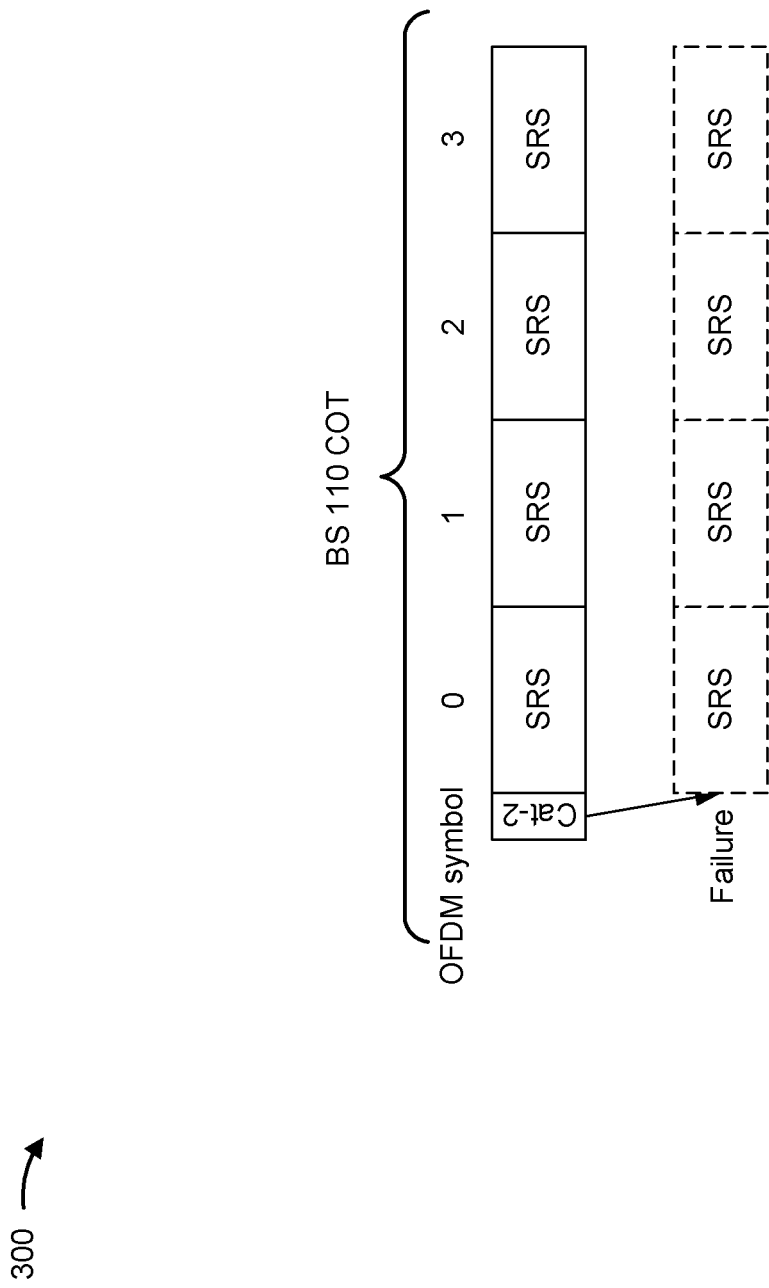
Figure 3G:
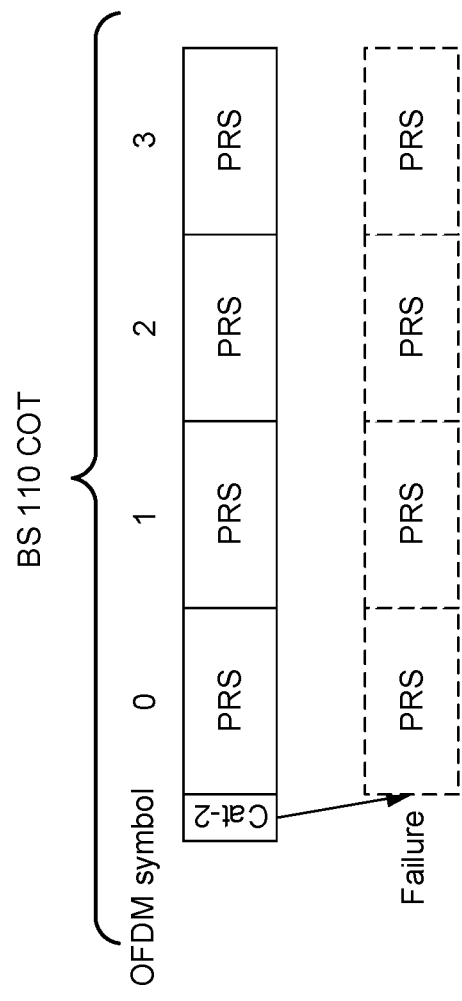

As shown in FIG. 3F, UE 120 may use an LBT procedure to access resources for transmitting repetitions of a SRS communication. In this case, UE 120 may attempt to successfully perform the LBT procedure before a threshold OFDM symbol to reserve resources for transmitting the SRS communication. In this case, the threshold symbol may be a first symbol (e.g., symbol 0) of a set of symbols and based at least in part on failing to access a channel using a category-2 LBT procedure, UE 120 may determine a failure for transmitting the SRS communication. Similarly, as shown in FIG. 3G, UE 120 may use a category-2 LBT procedure to attempt to access resources to transmit repetitions of a PRS communication in a set of OFDM symbols. Based at least in part on the threshold transmission opportunity being a first symbol (e.g., symbol 0) of a set of symbols, UE 120 may determine a failure of transmitting the PRS communication. Although some aspects are described in terms of the threshold transmission opportunity being a first OFDM symbol, other thresholds may be possible, such as a last OFDM symbol of a set of OFDM symbols, a symbol equal to half of a repetition factor of an SRS communication or a PRS communication, and/or the like.

As indicated above, FIGS. 3A-3G are provided as an example. Other examples may differ from what is described with respect to FIGS. 3A-3G.

Figure 4:
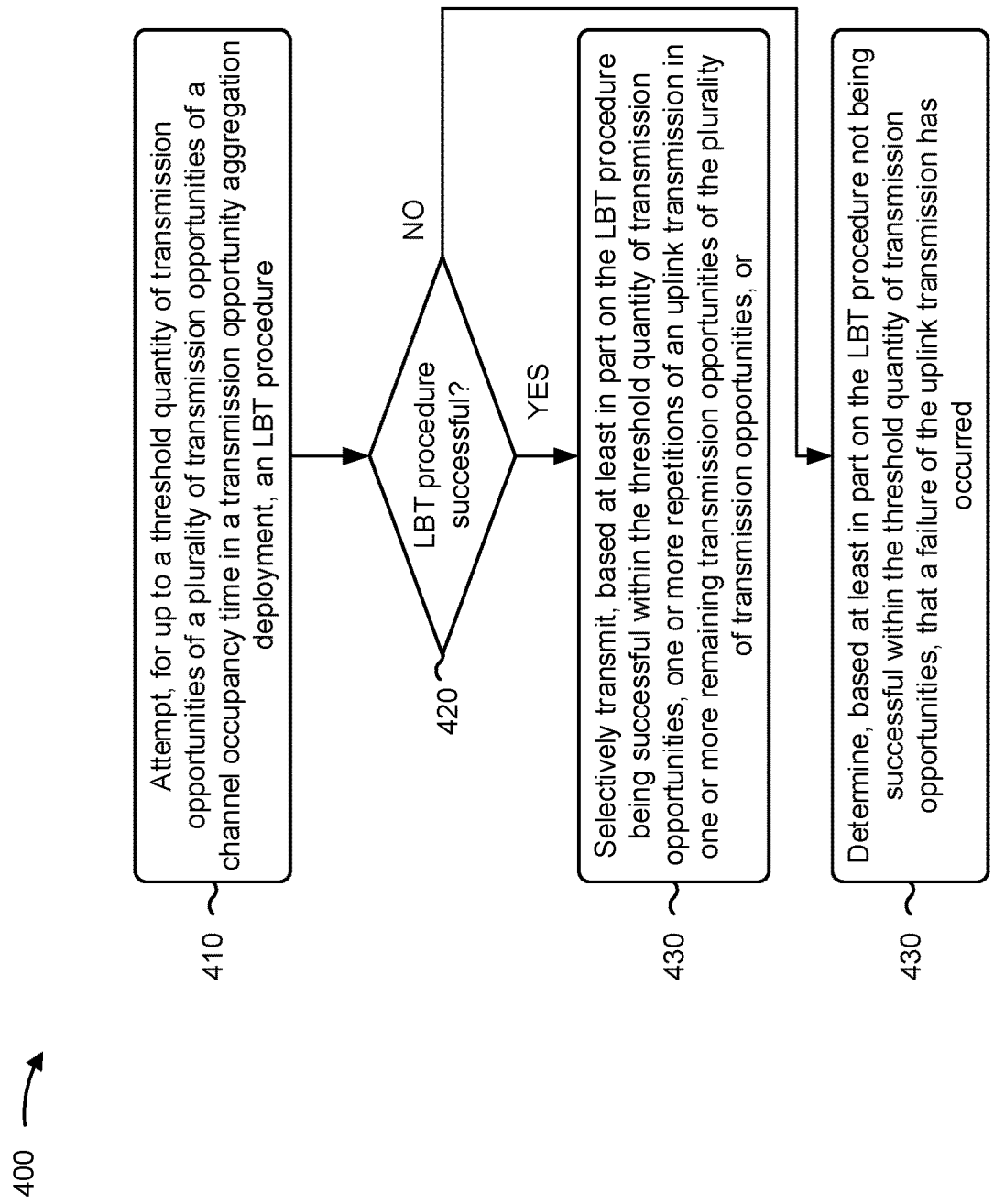
FIG. 4 is a diagram illustrating an example process performed, for example, by a UE, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120 and/or the like) performs operations associated with contiguous uplink transmission in contention-based access systems.

As shown in FIG. 4, in some aspects, process 400 may include attempting, for up to a threshold quantity of transmission opportunities of a plurality of transmission opportunities of a channel occupancy time in a transmission opportunity aggregation deployment, an LBT procedure (block 410). For example, the UE (e.g., using receive processor 258, transmit processor 264, controller/processor 280, memory 282, and/or the like) may attempt, for up to a threshold quantity of transmission opportunities of a plurality of transmission opportunities of a channel occupancy time in a transmission opportunity aggregation deployment, an LBT procedure, as described above.

As shown in FIG. 4, in some aspects, process 400 may include determining whether the LBT procedure is successful (block 420). For example, the UE (e.g., using receive processor 258, transmit processor 264, controller/processor 280, memory 282, and/or the like) may determine whether the LBT procedure is successful, as described above.

As further shown in FIG. 4, in some aspects, process 400 may include selectively transmitting, based at least in part on the LBT procedure being successful within the threshold quantity of transmission opportunities, one or more repetitions of an uplink transmission in one or more remaining transmission opportunities of the plurality of transmission opportunities, or (block 430—YES). For example, the UE (e.g., using receive processor 258, transmit processor 264, controller/processor 280, memory 282, and/or the like) may selectively transmit, based at least in part on the LBT procedure being successful within the threshold quantity of transmission opportunities, one or more repetitions of an uplink transmission in one or more remaining transmission opportunities of the plurality of transmission opportunities, as described above.

As further shown in FIG. 4, in some aspects, process 400 may include determining, based at least in part on the LBT procedure not being successful within the threshold quantity of transmission opportunities, that a failure of the uplink transmission has occurred (block 430—NO). For example, the UE (e.g., using receive processor 258, transmit processor 264, controller/processor 280, memory 282, and/or the like) may determine, based at least in part on the LBT procedure not being successful within the threshold quantity of transmission opportunities, that a failure of the uplink transmission has occurred, as described above.

Process 400 may include additional aspects, such as any single aspect or any combination of aspects described below and/or in connection with one or more other processes described elsewhere herein.

In a first aspect, a transmission opportunity, of the plurality of transmission opportunities, is a slot and the transmission opportunity aggregation deployment is a slot aggregation deployment.

In a second aspect, alone or in combination with the first aspect, the uplink transmission is a physical uplink control channel transmission.

In a third aspect, alone or in combination with one or more of the first and second aspects, the threshold quantity of transmission opportunities is one of: a quantity of transmission opportunities in the plurality of transmission opportunities, a single transmission opportunity, or a quantity of transmission opportunities equal to an aggregation level of the uplink transmission.

In a fourth aspect, alone or in combination with one or more of the first through third aspects, the LBT procedure is a category-4 LBT procedure or a category-2 LBT procedure.

In a fifth aspect, alone or in combination with one or more of the first through fourth aspects, determining that the failure of the uplink transmission has occurred comprises: forgoing the uplink transmission during the channel occupancy time, and attempting to transmit the uplink transmission during a subsequent channel occupancy time.

In a sixth aspect, alone or in combination with one or more of the first through fifth aspects, each transmission opportunity, of the one or more remaining transmission opportunities, is associated with a threshold separation, from each neighboring transmission opportunity, reserved for a corresponding LBT procedure.

In a seventh aspect, alone or in combination with one or more of the first through sixth aspects, the uplink transmission is a sounding reference signal transmission.

In an eighth aspect, alone or in combination with one or more of the first through seventh aspects, a transmission opportunity, of the plurality of transmission opportunities, is an orthogonal frequency division multiplexing symbol.

In a ninth aspect, alone or in combination with one or more of the first through eighth aspects, the uplink transmission is a positioning reference signal transmission.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   attempting, for up to a threshold quantity of transmission opportunities of a plurality of transmission opportunities of a channel occupancy time in a transmission opportunity aggregation deployment, a listen-before-talk (LBT) procedure, wherein the LBT procedure is a category-2 LBT procedure performed to reserve resources for a sounding reference signal (SRS) communication; and
   selectively transmitting, based at least in part on the LBT procedure being successful within the threshold quantity of transmission opportunities, one or more repetitions of an uplink transmission in one or more remaining transmission opportunities of the plurality of transmission opportunities, or
   determining, based at least in part on the LBT procedure not being successful within the threshold quantity of transmission opportunities, that a failure of the uplink transmission has occurred.

2. The method of claim 1, wherein a transmission opportunity, of the plurality of transmission opportunities, is a slot and the transmission opportunity aggregation deployment is a slot aggregation deployment.

3. The method of claim 1, wherein the uplink transmission is a physical uplink control channel transmission, wherein selectively transmitting the one or more repetitions comprises selectively transmitting a plurality of repetitions of the physical uplink control channel transmission in a plurality of consecutive slots.

4. The method of claim 1, wherein the threshold quantity of transmission opportunities is one of:
   a quantity of transmission opportunities in the plurality of transmission opportunities,
   a single transmission opportunity, or
   a quantity of transmission opportunities equal to an aggregation level of the uplink transmission.

5. The method of claim 1, wherein determining that the failure of the uplink transmission has occurred comprises:
   forgoing the uplink transmission during the channel occupancy time; and
   attempting to transmit the uplink transmission during a subsequent channel occupancy time.

6. The method of claim 1, wherein each transmission opportunity, of the one or more remaining transmission opportunities, is associated with a threshold separation, from each neighboring transmission opportunity, reserved for a corresponding LBT procedure.

7. The method of claim 1, wherein the uplink transmission is a sounding reference signal transmission.

8. The method of claim 1, wherein a transmission opportunity, of the plurality of transmission opportunities, is an orthogonal frequency division multiplexing symbol.

9. The method of claim 1, wherein the uplink transmission is a positioning reference signal transmission.

10. A user equipment (UE) for wireless communication, comprising:
    one or more memories; and
    one or more processors coupled to the one or more memories and configured to:
    attempt, for up to a threshold quantity of transmission opportunities of a plurality of transmission opportunities of a channel occupancy time in a transmission opportunity aggregation deployment, a listen-before-talk (LBT) procedure, wherein the LBT procedure is a category-2 LBT procedure performed to reserve resources for a sounding reference signal (SRS) communication; and
    selectively transmit, based at least in part on the LBT procedure being successful within the threshold quantity of transmission opportunities, one or more repetitions of an uplink transmission in one or more remaining transmission opportunities of the plurality of transmission opportunities, or
    determine, based at least in part on the LBT procedure not being successful within the threshold quantity of transmission opportunities, that a failure of the uplink transmission has occurred.

11. An apparatus for wireless communication, comprising:
- means for attempting, for up to a threshold quantity of transmission opportunities of a plurality of transmission opportunities of a channel occupancy time in a transmission opportunity aggregation deployment, a listen-before-talk (LBT) procedure, wherein the LBT procedure is a category-2 LBT procedure performed to reserve resources for a sounding reference signal (SRS) communication; and
- means for selectively transmitting, based at least in part on the LBT procedure being successful within the threshold quantity of transmission opportunities, one or more repetitions of an uplink transmission in one or more remaining transmission opportunities of the plurality of transmission opportunities, or
  - means for determining, based at least in part on the LBT procedure not being successful within the threshold quantity of transmission opportunities, that a failure of the uplink transmission has occurred.

12. The UE of claim 10, wherein a transmission opportunity, of the plurality of transmission opportunities, is a slot and the transmission opportunity aggregation deployment is a slot aggregation deployment.

13. The UE of claim 10, wherein the uplink transmission is a physical uplink control channel transmission, wherein the one or more processors, when configured to transmit the one or more repetitions, are configured to selectively transmit a plurality of repetitions of the physical uplink control channel transmission in a plurality of consecutive slots.

14. The UE of claim 10, wherein the threshold quantity of transmission opportunities is one of:
- a quantity of transmission opportunities in the plurality of transmission opportunities,
- a single transmission opportunity, or
- a quantity of transmission opportunities equal to an aggregation level of the uplink transmission.

15. The UE of claim 10, wherein the one or more processors, when configured to determine that the failure of the uplink transmission has occurred, are configured to:
- forgo the uplink transmission during the channel occupancy time; and
- attempt to transmit the uplink transmission during a subsequent channel occupancy time.

16. The UE of claim 10, wherein each transmission opportunity, of the one or more remaining transmission opportunities, is associated with a threshold separation, from each neighboring transmission opportunity, reserved for a corresponding LBT procedure.

17. The UE of claim 10, wherein the uplink transmission is a sounding reference signal transmission.

18. The UE of claim 10, wherein a transmission opportunity, of the plurality of transmission opportunities, is an orthogonal frequency division multiplexing symbol.

19. The UE of claim 10, wherein the threshold quantity of transmission opportunities corresponds to a particular orthogonal frequency division multiplexing (OFDM) symbol of the channel occupancy time, the particular OFDM symbol being a first OFDM symbol of the channel occupancy time.

20. The apparatus of claim 11, wherein the uplink transmission comprises a physical uplink control channel transmission, and
wherein the means for selectively transmitting the one or more repetitions comprise means for selectively transmitting a plurality of repetitions of the physical uplink control channel transmission in a plurality of consecutive slots.

21. The apparatus of claim 11, wherein the one or more repetitions include one or more repetitions of the SRS communication.

22. The method of claim 1, wherein the one or more repetitions include one or more repetitions of the SRS communication.

23. The UE of claim 10, wherein the one or more repetitions include one or more repetitions of the SRS communication.

24. The apparatus of claim 11, wherein a transmission opportunity, of the plurality of transmission opportunities, is an orthogonal frequency division multiplexing symbol.

* * * * *